US006614198B2

(12) United States Patent
Väisänen

(10) Patent No.: US 6,614,198 B2
(45) Date of Patent: Sep. 2, 2003

(54) METHOD AND APPARATUS FOR CONTROLLING RELEASE OF HOISTING MOTOR BRAKE IN HOISTING APPARATUS

(75) Inventor: Ari Väisänen, Hyvinkää (FI)

(73) Assignee: KCI Konecranes Plc., Hyvinkää (FI)

( * ) Notice: Subject to any disclaimer, the term of this patent is extended or adjusted under 35 U.S.C. 154(b) by 0 days.

(21) Appl. No.: 09/940,464

(22) Filed: Aug. 29, 2001

(65) Prior Publication Data

US 2002/0023803 A1 Feb. 28, 2002

(30) Foreign Application Priority Data

Aug. 29, 2000 (FI) ............................................ 20001905

(51) Int. Cl.[7] ................................................ H02K 17/32

(52) U.S. Cl. ....................... 318/434; 318/490; 318/563; 318/430; 318/433; 318/475; 318/607; 388/815

(58) Field of Search ....................... 73/862.68; 318/490, 318/434, 563, 430, 431, 432, 433, 475, 488, 607, 674; 388/815, 811

(56) References Cited

U.S. PATENT DOCUMENTS 4,698,565 A * 10/1987 Behnke et al. .............. 388/811
4,733,148 A 3/1988 Rodi
5,408,767 A * 4/1995 Hazama et al. ............... 37/396
5,859,373 A 1/1999 Munzebrock et al.

FOREIGN PATENT DOCUMENTS

FR 2 675 790 10/1992
JP 4 265 681 9/1992

* cited by examiner

*Primary Examiner*—Karen Masih
(74) *Attorney, Agent, or Firm*—Birch, Stewart, Kolasch & Birch, LLP

(57) ABSTRACT

A method and an apparatus for controlling release of a hoisting motor brake in a hoisting apparatus, where electricity is used as the driving force and a squirrel cage motor as the hoisting motor for hoisting or lowering a load attached to a hoisting member of the hoisting apparatus. Controlling of brake release comprises measuring the current and supply voltage of the hoisting motor after the start-up period of the hoisting motor and determining a variable which describes the load of the hoisting apparatus from the current and supply voltage. The variable describing the load is compared with a pre-determined limit value and hoisting or lowering of the load is interrupted if the variable describing the hoisting apparatus load exceeds the limit value set for the hoisting movement when the load is hoisted or if it exceeds the limit value set for the lowering movement when the load is lowered.

20 Claims, 2 Drawing Sheets

Figure 1:
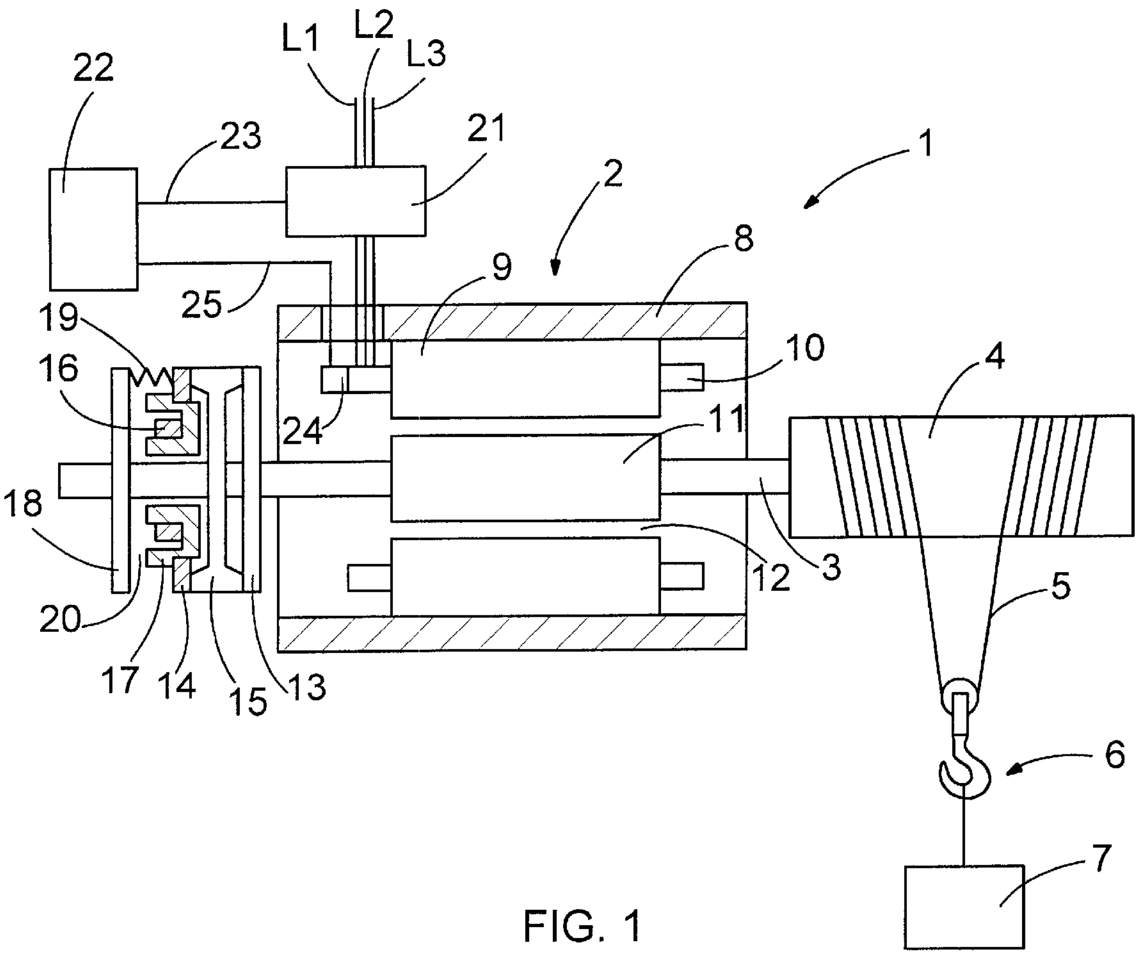

METHOD AND APPARATUS FOR CONTROLLING RELEASE OF HOISTING MOTOR BRAKE IN HOISTING APPARATUS

The invention relates to a method of controlling release of a hoisting motor brake in a hoisting apparatus, where electricity is used as the driving force and a squirrel cage motor as the hoisting motor for hoisting or lowering a load attached to a hoisting member of the hoisting apparatus.

The invention further relates to an apparatus for controlling release of a hoisting motor brake in a hoisting apparatus, where electricity is used as the driving force and a squirrel cage motor as the hoisting motor for hoisting or lowering a load attached to a hoisting member of the hoisting apparatus.

In electric hoisting apparatuses intended for hoisting and lowering a load the hoisting motor includes a brake by means of which the load to be hoisted or lowered is kept in the air when the hoisting motor is not driven. In hoisting operation the brake torque is nearly double the nominal torque of the motor. If the brake is not released e.g. when the nominal load of the hoisting apparatus is lowered, torque corresponding to the nominal torque is required of the hoisting motor for implementing the lowering movement. The hoisting motor can easily generate this torque. In that case the thermal losses in the brake are double the nominal power of the hoisting motor. This normally damages the brake after a drive of a few seconds, and when the drive is finished, the brake no longer holds the load in the air but it falls freely to the ground. Controlling of release of the hoisting motor brake is thus important for safety reasons. If the brake stays on, the motor winding may also burn, which causes considerable economical losses.

FR 2 675 790 discloses a solution for controlling release of the hoisting motor brake where an inductive sensor is used to detect brake release on the basis of the movement of the brake disc when the hoisting motor is started up. If no signal confirming brake release is received from the sensor, the use of the hoisting motor is interrupted and the alarm is activated. This solution is relatively complicated and unreliable in practice because it is difficult for the sensor to detect movement of the brake disc due to its short travel. Furthermore, the sensor and its installation increase the costs considerably.

U.S. Pat. No. 4,733,148 discloses a solution for controlling the brake of a printing press drive motor when the motor is started up. The solution comprises two phases: in the first phase it is checked that the brake torque is sufficient for preventing rotation of the motor when the brake is on. In the second phase it is checked that the brake has been released when the motor is started up. Checking of the sufficient capacity of the brake and brake release is based on determination of the rotational speed of the motor. The rotational speed of the motor is measured with a tachometer or determined from the armature voltage of the motor if the motor is a direct-current motor. Also in this solution both acquisition and installation of additional sensors increase the costs considerably.

The object of the present invention is to provide a new method and apparatus for controlling release of a hoisting motor brake in a hoisting apparatus.

The method according to the invention is characterized by measuring the current and supply voltage of the hoisting motor after the startup period of the hoisting motor and determining a variable which describes the load of the hoisting apparatus from the current and supply voltage and is compared with a pre-determined limit value, and interrupting hoisting or lowering of the load if the variable describing the hoisting apparatus load exceeds the limit value set for the hoisting movement when the load is hoisted or if it exceeds the limit value set for the lowering movement when the load is lowered.

The apparatus according to the invention is characterized in that the apparatus comprises means for measuring the current and supply voltage of the hoisting motor and a brake controlling device, which comprises means for determining a variable which describes the load of the hoisting motor from the current and supply voltage of the hoisting motor, and that the brake controlling device further comprises means for comparing the variable describing the load with a pre-determined limit value and means for interrupting hoisting or lowering of the load if the variable describing the hoisting apparatus load exceeds the limit value set for the hoisting movement when the load is hoisted or if it exceeds the limit value set for the lowering movement when the load is lowered.

The basic idea of the invention is that in a hoisting apparatus where electricity is used as the driving force and a squirrel cage motor as the hoisting motor for hoisting or lowering a load attached to the hoisting member of the hoisting apparatus, release of the hoisting motor brake is controlled by comparing a variable which describes the hoisting apparatus load and is determined from the current and supply voltage measured from the hoisting motor after its start-up period with a pre-determined limit value. If the variable describing the hoisting apparatus load exceeds a limit value set for the hoisting movement when the load is being hoisted or the limit value set for the lowering movement when the load is being lowered, the hoisting or lowering of the load is interrupted. According to a preferred embodiment of the invention, air gap torque is used as the variable describing the hoisting apparatus load. The air gap torque is preferably determined using magnetization flux of the hoisting motor.

An advantage of the invention is that release of the hoisting apparatus brake can be controlled without providing the brake with separate sensors or switches, the acquisition and installation of which increase the costs considerably and the function of which is unreliable due to short travels in the disc brake. The solution of the invention also improves thermal protection of the motor in the case of overloading and jamming of the rotor, which may result from improper use or malfunction of the hoisting apparatus. The method is also very accurate and reliable in varying operating conditions typical of hoisting operation if the air gap torque of the hoisting motor, which is determined from magnetization flux of the hoisting motor, is used as the variable describing the hoisting motor load.

Figure 2:
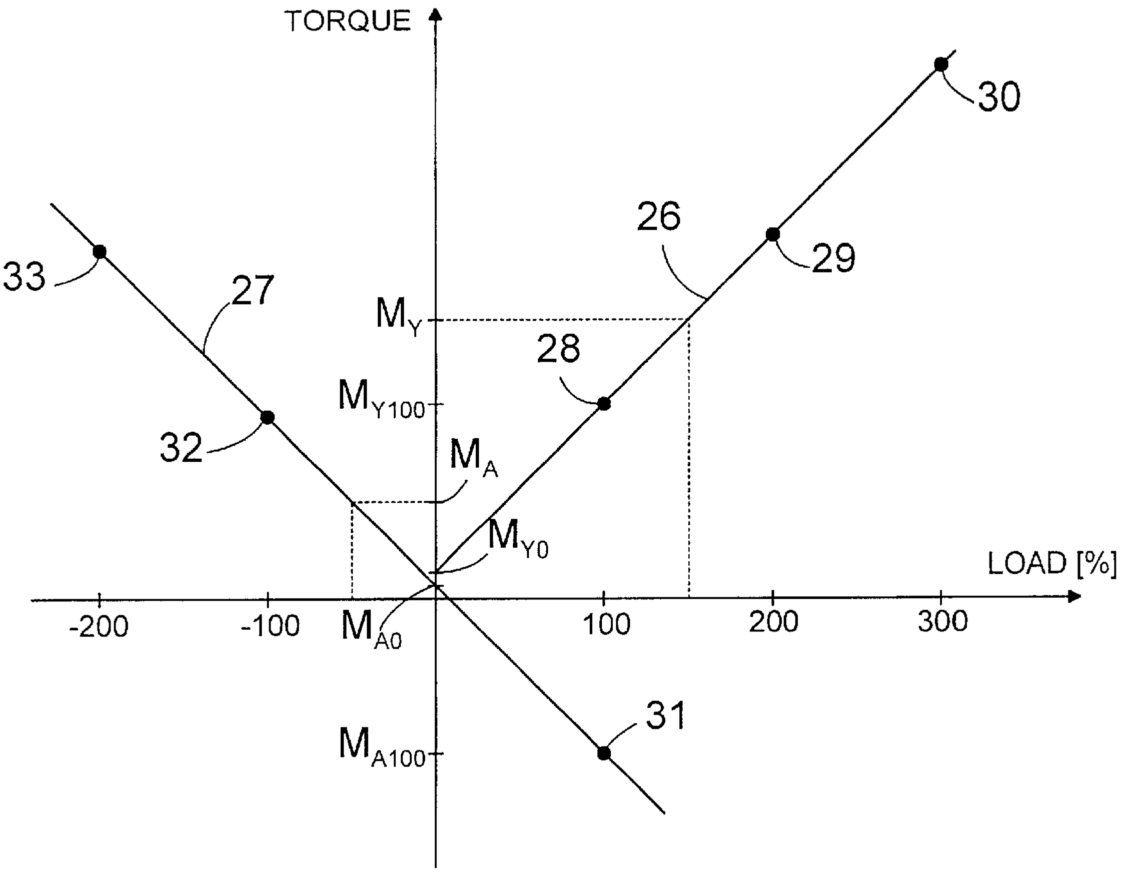

The invention will be described in greater detail in the accompanying drawings, in which FIG. 1 is a schematic and partly cross-sectional view of a hoisting apparatus in which the method and apparatus of the invention are applied, and FIG. 2 schematically illustrates dependency between the hoisting motor torque and the hoisting apparatus load.

FIG. 1 is a schematic and partly cross-sectional view of a hoisting apparatus in which the method and apparatus of the invention are applied. The hoisting apparatus 1 shown in FIG. 1 comprises a partly cross-sectional hoisting motor 2, which is connected to a power source, i.e. electricity network, via phase conductors L1, L2 and L3. The hoisting motor 2 is arranged to rotate a winding drum 4 through a shaft 3. In FIG. 1 the hoisting motor 2 is arranged to directly rotate the winding drum 4, but the hoisting motor 2 can also be arranged to rotate the winding drum 4 through a gear or gears. The shaft 3 is mounted in end shields at both ends of the hoisting motor 2 with bearings in a manner known per se, and thus for the sake of clarity the end shields and the bearings are not shown in FIG. 1. Depending on the direction of rotation of the hoisting motor 2 and the winding drum 4, a hoisting member 5 to be stored on the winding drum 4 is either wound on the winding drum 4 or off the winding drum 4, and thus the load 7 hanging from a lifting hook 6 goes up or down. A rope, for example, can be used as the hoisting member 5. The hoisting motor 2 is a three-phase squirrel cage motor which may be provided with one or more speeds and is controlled by contactors or other similar controlling elements, which are not shown in FIG. 1 for the sake of clarity.

The hoisting motor 2 illustrated schematically at a standstill in FIG. 1 comprises a frame 8, stator 9, stator winding 10 and rotor 11. Between the stator 9 and the rotor 11 there is an air gap 12, the width of which has been clearly exaggerated compared to the rest of the hoisting motor 2. The structure of the stator 9 has also been emphasized compared to the rotor 11. In the schematic illustration of FIG. 1 the hoisting motor 2 further comprises a disc brake assembly, which is switched by spring force and released electromagnetically by a DC magnet. The assembly comprises brake discs 13 and 14, a brake wheel 15, a magnetic coil 16, a frame 17 for the magnetic coil, an armature disc 18 and a brake spring 19. Between the frame 17 of the magnetic coil 16 and the armature disc 18 there is an air gap 20, which is shown as substantially wider than it really is compared to the rest of the brake assembly. The brake disc 13 is arranged e.g. in the frame 8 of the hoisting motor 2 or in an end flange so that the brake disc 13 cannot move in the direction of the shaft 3 or rotate as the shaft 3 rotates. The brake wheel 15 is arranged onto the shaft 3 so that the brake wheel 15 rotates along with the shaft 3. The brake disc 14 is locked to the frame 17 of the magnetic coil 16 e.g. with a retaining ring to allow the brake disc 14 to move along with the frame 17 of the magnetic coil 16 as it moves parallel with the shaft 3. Both the frame 17 of the magnetic coil 16 and the armature disc 18 are supported so that they cannot rotate as the shaft 3 rotates. Neither this support nor the casing covering the brake assembly are shown in FIG. 1 for the sake of clarity. When the voltage acting on the magnetic coil 16 is switched off, the influence of the brake spring 19 moves the frame 17 of the magnetic coil 16 to the right in FIG. 1, in which case the brake wheel 15 is pressed between the brake discs 13 and 14, and thus stops the motor 2. Even though FIG. 1 shows only one brake spring, it is clear that there can be more brake springs or the brake assembly can be implemented otherwise so that the brake wheel 15 is pressed evenly between the brake discs 13 and 14. When voltage is switched to the magnetic coil 16, the magnetic field pulls the frame 17 of the magnetic coil 16 close to the armature disc 18, thus releasing the brake wheel 15. For the sake of clarity FIG. 1 does not show the control circuit of the magnetic coil 16.

In hoisting operation the brake torque is approximately double the nominal torque of the motor 2. As the friction surfaces in the brake discs 13 and 14 wear, the air gap 20 between the frame 17 of the magnetic coil 16 and the armature disc 18 grows. The air gap 20 may grow so wide that the magnet cannot release the brake but it stays on. Also a defective control circuit of the brake can result in jamming of the brake. In that case the motor 2 has to rotate against the brake torque, which may damage the brake or burn the stator winding 10.

In the solution according to the invention controlling of release of the brake of the hoisting apparatus 1, i.e. the hoisting motor 2, is implemented by means of a variable which describes the load of the hoisting apparatus 1. Torque of the hoisting motor 2 or the power corresponding to it can be used as the variable describing the hoisting apparatus 1 load. FIG. 2 schematically illustrates dependency between the hoisting motor 2 torque and the hoisting apparatus 1 load. Ascending line 26 describes dependency between the torque and the load during a hoisting movement and descending line 27 describes dependency between the torque and the load during a lowering movement. The hoisting movement refers to hoisting of the load 7 and the lowering movement to lowering of the load 7. According to the solution, reference values corresponding to the zero load and nominal load of the hoisting apparatus 1 are determined for the torque of the hoisting motor 2 at all speeds both in the direction of the hoisting movement and in the direction of the lowering movement. The reference values can be determined by calculation, by hoisting and lowering an empty hook 6 and the known nominal load or in another manner. The torque reference value corresponding to the zero load is $M_{Y0}$ for the hoisting movement and $M_{A0}$ for the lowering movement. Correspondingly, the torque reference value corresponding to the nominal load, i.e. 100% load, is $M_{y100}$ for the hoisting movement and $M_{A100}$ for the lowering movement. In FIG. 2 operating point 28 corresponds to reference value $M_{y100}$ and operating point 31 to reference value $M_{A100}$. Operating point 29 corresponds to a situation where the brake has jammed upon hoisting of the empty hook, and operating point 30 corresponds to a situation where the brake has jammed upon hoisting of the nominal load of the hoisting apparatus. Operating point 32 corresponds to a situation where the brake has jammed upon lowering of the nominal load of the hoisting apparatus 1, and operating point 33 corresponds to a situation where the brake has jammed upon lowering of the empty hook. During the hoisting movement jamming of the brake, i.e. the fact that the brake is not released, is noticed if the hoisting motor 2 torque is positive after a start-up period of about 0.3 to 1 s and preferably higher than the torque value corresponding to a load of approximately 150%. This value is denoted by $M_Y$ in FIG. 2. In the case of the lowering movement the hoisting motor 2 normally functions as a generator and the torque is negative. During the lowering movement jamming of the brake is noticed if the torque of the hoisting motor 2 is positive after a start-up period of about 0.3 to 1 s and preferably higher than the torque value corresponding to a −50% load. This value is denoted by $M_A$ in FIG. 2. When jamming of the brake is noticed, the hoisting or the lowering movement is interrupted by switching power supply off from the hoisting motor 2. The limit values $M_Y$ and $M_A$ are not, however, restricted to the above-mentioned values, but their values may vary. FIG. 2 illustrates only one way of choosing the dependency between the hoisting apparatus 1 load and the hoisting motor 2 torque. The dependency between the hoisting apparatus 1 load and the hoisting motor 2 torque can be described in several ways without affecting the basic idea of the invention. Depending on the selected method of description, it is examined whether the dependency exceeds the limit value or is below it. Furthermore, instead of the hoisting motor 2 torque, it is possible to use the hoisting motor 2 power in the same way.

The hoisting motor 2 torque or power describing the hoisting apparatus 1 load is determined from the current I and supply voltage U of the hoisting motor 2. For this reason the phase conductors L1, L2 and L3 are provided with a measuring device 21, which comprises means for measuring the current I and supply voltage U in a manner known per se. The measured current and supply voltage information can be supplied to a brake controlling device 22, which monitors release of the brake along separate wires, or like in FIG. 1, along a common cable 23. The brake controlling device 22 comprises means for determining the torque or the power describing the hoisting apparatus 1 load and means for comparing the torque or the power in the manner explained above with the limit values $M_y$ and $M_A$ set for the hoisting movement and the lowering movement and stored in the memory of the brake controlling device 22. The brake controlling device 22 further comprises means for switching power feed off from the hoisting motor 2 to stop it as the limit value set for the hoisting movement or the limit value set for the lowering movement is exceeded. This can be carried out e.g. by a relay switch which opens and thus prevents supply of control voltage to the control elements of the hoisting motor 2. The brake controlling device 22 can be e.g. a device provided with a microprocessor, in which case the method of the invention is simple and economical to implement. The brake controlling device 22 can also be arranged in connection with the phase conductors L1, L2 and L3. In that case it may comprise means for measuring the supply voltage U, and thus the measuring device 21 comprises means for measuring the current I. The stator winding 10 resistance R of the hoisting motor 2 can also be taken into account in the determination of the hoisting motor 2 torque or power. For this reason the stator winding 10 is provided with a measuring member 24 for measuring the stator winding 10 resistance R, the value of which is transferred to the brake controlling device 22 along a wire 25. Alternatively, the measuring member 24 measures the stator winding 10 temperature T, from which the stator winding 10 resistance R can be calculated in a manner known per se to a person skilled in the art, e.g. according to standard IEC34-1(-94). When lower accuracy is sufficient, the resistance R can also be assumed constant.

The solution according to the invention allows controlling of brake release without providing the brake with separate sensors or switches, the acquisition and installation of which increase the costs considerably and the operation of which is very unreliable due to short travels in the disc brake. The solution also improves thermal protection of the motor in the case of overloading and jamming of the rotor, which may result from improper use or malfunction of the hoisting apparatus.

According to a preferred embodiment of the invention, the variable describing the hoisting apparatus 1 load is air gap torque $M_\delta$ of the hoisting motor 2, which can be calculated from the following formula, for example $$M_\delta = K_1 \backslash I \times \Psi_m \backslash, \tag{1}$$

where $K_1$ is a motor-specific constant dependent on the number of the pole pairs, I is the hoisting motor 2 current and $\Psi_m$ is the magnetization flux of the hoisting motor 2. In the case of a hoisting motor of less than 4 kW the value of the motor-specific constant $K_1$ can typically vary in the range $K_1=1-6$. The air gap torque $M_\delta$is determined from formula (1) by measuring, after the startup period of the hoisting motor 2, the current 1, supply voltage U and stator winding resistance R of the hoisting motor 2, which are used for determining the magnetization voltage of the hoisting motor 2: $U_m=U-RI$. The magnetization voltage $U_m$ generates magnetization flux $\Psi_m$ of the hoisting motor 2, which can be determined by integrating the magnetization voltage $U_m$ as a function of time. The air gap torque $M_\delta$ of the hoisting motor 2 can also be determined e.g. on the basis of the air gap power $P_\delta$ and technical information of the hoisting motor 2. However, use of the magnetization flux $\Psi_m$ in the determination of the air gap torque $M_\delta$ is advantageous because the effects of changing operating conditions typical of hoisting operation, such as supply voltage, temperature, load, operation as a motor and generator, can be clearly seen as changes in the magnetization flux $\Psi_m$ of the hoisting motor 2. Due to asymmetry that may appear in the electricity network, voltages are measured from each of the three phases and currents from at least two phases. The air gap power $P_\delta$ of the hoisting motor 2 can also be used as the variable describing the hoisting apparatus 1 load. DE 19 617 105 describes a solution for measuring the hoisting apparatus load where the air gap power $P_\delta$ of the hoisting motor 2, which is determined from the current I, supply voltage U and stator winding 10 resistance R of the hoisting motor 2, is arranged to describe the hoisting apparatus 1 load. The electric power taken from the electricity network by the hoisting motor 2 can also be used as the variable describing the hoisting apparatus 1 load.

The drawings and the related description are only intended to illustrate the inventive concept. The details of the invention may vary within the scope of the claims. Thus the appearance of the hoisting apparatus I shown in FIG. 1 can vary in several ways and it can be fixed or movable along a track by means of a trolley. Furthermore, instead of a rope, the hoisting member 5 can be a wire rope, chain, belt or another similar hoisting member. Instead of the winding drum 4, the hoisting member 5 can be stored on a roll, bag, chain bag or the like. The number of phase conductors of the hoisting motor 2 may also vary, depending on the application. Regardless of whether the hoisting motor 2 torque or power is used as the variable describing the hoisting apparatus 1 load, the accuracy of the method can be improved by taking into account iron losses and/or additional load losses of the hoisting motor 2. It is also clear that if the hoisting apparatus 1 comprises a load measuring device for determining the hoisting apparatus 1 load, the brake controlling device 22 and the load measuring device can be integrated into one device. Furthermore, it is obvious that the structure of the brake may be modified without affecting the solution of the invention, i.e. a shoe brake, for example, can be used in place of the disc brake.

What is claimed is:

1. A method of controlling a hoisting apparatus, where electricity is used as the driving force and a squirrel cage motor as the hoisting motor for hoisting or lowering a load attached to a hoisting member of the hoisting apparatus, comprising:

measuring the current and supply voltage of the hoisting motor after the start-up period of the hoisting motor, determining a variable which describes the load of the hoisting apparatus from the current and supply voltage, comparing the variable with a predetermined limit value, and interrupting hoisting or lowering of the load if the variable describing the hoisting apparatus load exceeds the limit value set for the hoisting movement when the load is hoisted or if it exceeds the limit value set for the lowering movement when the load is lowered to control the release of a hoisting motor brake.

2. A method of controlling release of a hoisting motor brake in a hoisting apparatus, where electricity is used as the driving force and a squirrel cage motor as the hoisting motor for hoisting or lowering a load attached to a hoisting member of the hoisting apparatus, comprising:

measuring the current and supply voltage of the hoisting motor after the start-up period of the hoisting motor, determining a variable which describes the load of the hoisting apparatus from the current and supply voltage, comparing the variable with a predetermined limit value, and interrupting hoisting or lowering of the load if the variable describing the hoisting apparatus load exceeds the limit value set for the hoisting movement when the load is hoisted or if it exceeds the limit value set for the lowering movement when the load is lowered;

wherein the limit value for hoisting movement is a value corresponding to a load of approximately 150% when the load is hoisted, and when the load is lowered, the limit value for lowering movement is a value corresponding to a load of approximately −50%.

3. A method according to claim 2, wherein the limit values for the hoisting and the lowering movement are determined by hoisting and lowering the zero load and the nominal load of the hoisting apparatus.

4. A method of controlling release of a hoisting motor brake in a hoisting apparatus, where electricity is used as the driving force and a squirrel cage motor as the hoisting motor for hoisting or lowering a load attached to a hoisting member of the hoisting apparatus, comprising:

measuring the current and supply voltage of the hoisting motor after the start-up period of the hoisting motor, determining a variable which describes the load of the hoisting apparatus from the current and supply voltage, comparing the variable with a predetermined limit value, and interrupting hoisting or lowering of the load if the variable describing the hoisting apparatus load exceeds the limit value set for the hoisting movement when the load is hoisted or if it exceeds the limit value set for the lowering movement when the load is lowered;

wherein the limit values are determined separately for each speed of the hoisting apparatus both in the direction of the hoisting movement and in the direction of the lowering movement.

5. A method of controlling release of a hoisting motor brake in a hoisting apparatus, where electricity is used as the driving force and a squirrel cage motor as the hoisting motor for hoisting or lowering a load attached to a hoisting member of the hoisting apparatus, comprising:

measuring the current and supply voltage of the hoisting motor after the start-up period of the hoisting motor, determining a variable which describes the load of the hoisting apparatus from the current and supply voltage, comparing the variable with a predetermined limit value, and interrupting hoisting or lowering of the load if the variable describing the hoisting apparatus load exceeds the limit value set for the hoisting movement when the load is hoisted or if it exceeds the limit value set for the lowering movement when the load is lowered;

wherein the stator winding resistance of hoisting motor is determined and the variable describing the hoisting apparatus load is determined from the current, supply voltage and stator winding resistance of the hoisting motor.

6. A method according to claim 5, wherein the stator winding resistance is determined by measuring the stator winding resistance.

7. A method according to claim 5, wherein the stator winding temperature is measured and the stator winding resistance is calculated from the stator winding temperature.

8. A method of controlling release of a hoisting motor brake in a hoisting apparatus, where electricity is used as the driving force and a squirrel cage motor as the hoisting motor for hoisting or lowering a load attached to a hoisting member of the hoisting apparatus, comprising:

measuring the current and supply voltage of the hoisting motor after the start-up period of the hoisting motor, determining a variable which describes the load of the hoisting apparatus from the current and supply voltage, comparing the variable with a predetermined limit value and interrupting hoisting or lowering of the load if the variable describing the hoisting apparatus load exceeds the limit value set for the hoisting movement when the load is hoisted or if it exceeds the limit value set for the lowering movement when the load is lowered;

wherein the variable describing the hoisting apparatus load is air gap torque of the hoisting motor.

9. A method according to claim 8, wherein the air gap torque is determined utilizing magnetization flux of the hoisting motor determined on the basis of the current, supply voltage and stator winding resistance of the hoisting motor.

10. A method according to claim 9, wherein the magnetization flux of the hoisting motor is determined by integrating as a function of time the magnetization voltage of the hoisting motor determined on the basis of the current, supply voltage and stator winding resistance of the hoisting motor.

11. An apparatus for controlling a hoisting apparatus, where electricity is used as the driving force and a squirrel cage motor as the hoisting motor for hoisting or lowering a load attached to a hoisting member of the hoisting apparatus, the apparatus comprising:

means for measuring the current and supply voltage of the hoisting motor, and a brake controlling device, which comprises:

means for determining a variable which describes the load of the hoisting motor from the current and supply voltage of the hoisting motor, means for comparing the variable describing the load with a pre-determined limit value and means for interrupting hoisting or lowering of the load if the variable describing the hoisting apparatus load exceeds the limit value set for the hoisting movement when the load is hoisted or if it exceeds the limit value set for the lowering movement when the load is lowered to control the release of a hoisting motor brake.

12. An apparatus for controlling release of a hoisting motor brake in a hoisting apparatus, where electricity is used as the driving force and a squirrel cage motor as the hoisting motor for hoisting or lowering a load attached to a hoisting member of the hoisting apparatus, the apparatus comprising means for measuring the current and supply voltage of the hoisting motor and a brake controlling device, which comprises means for determining a variable which describes the load of the hoisting motor from the current and supply voltage of the hoisting motor, the brake controlling device further comprising means for comparing the variable describing the load with a pre-determined limit value and means for interrupting hoisting or lowering of the load if the variable describing the hoisting apparatus load exceeds the limit value set for the hoisting movement when the load is hoisted or if it exceeds the limit value set for the lowering movement when the load is lowered, wherein the limit value for hoisting movement is set to correspond to a value corresponding to a load of approximately 150% when the load is hoisted, and when the load is lowered, the limit value for lowering movement is set to correspond to a value corresponding to a load of approximately −50%.

13. An apparatus according to claim 12, wherein the limit values of the hoisting and the lowering movement are arranged to be determined by hoisting and lowering the zero load and the nominal load of the hoisting apparatus.

14. An apparatus for controlling release of a hoisting motor brake in a hoisting apparatus, where electricity is used as the driving force and a squirrel cage motor as the hoisting motor for hoisting or lowering a load attached to a hoisting member of the hoisting apparatus, the apparatus comprising means for measuring the current and supply voltage of the hoisting motor and a brake controlling device, which comprises means for determining a variable which describes the load of the hoisting motor from the current and supply voltage of the hoisting motor, the brake controlling device further comprising means for comparing the variable describing the load with a pre-determined limit value and means for interrupting hoisting or lowering of the load if the variable describing the hoisting apparatus load exceeds the limit value set for the hoisting movement when the load is hoisted or if it exceeds the limit value set for the lowering movement when the load is lowered, wherein the limit values are arranged to be determined separately for each speed of the hoisting apparatus both in the direction of the hoisting movement and in the direction of the lowering movement.

15. An apparatus for controlling release of a hoisting motor brake in a hoisting apparatus, where electricity is used as the driving force and a squirrel cage motor as the hoisting motor for hoisting or lowering a load attached to a hoisting member of the hoisting apparatus, the apparatus comprising means for measuring the current and supply voltage of the hoisting motor and a brake controlling device, which comprises means for determining a variable which describes the load of the hoisting motor from the current and supply voltage of the hoisting motor, the brake controlling device further comprising means for comparing the variable describing the load with a pre-determined limit value and means for interrupting hoisting or lowering of the load if the variable describing the hoisting apparatus load exceeds the limit value set for the hoisting movement when the load is hoisted or if it exceeds the limit value set for the lowering movement when the load is lowered, wherein the apparatus comprises a measuring member for measuring a variable describing the stator winding resistance of the hoisting motor and the brake controlling device comprises means for determining the variable describing the hoisting apparatus load from the current, the supply voltage and a variable describing stator winding resistance of the hoisting motor.

16. An apparatus according to claim 15, wherein the measuring member is arranged to measure the stator winding resistance.

17. An apparatus according to claim 15, wherein the measuring member is arranged to measure the stator winding temperature.

18. An apparatus for controlling release of a hoisting motor brake in a hoisting apparatus, where electricity is used as the driving force and a squirrel cage motor as the hoisting motor for hoisting or lowering a load attached to a hoisting member of the hoisting apparatus, the apparatus comprising means for measuring the current and supply voltage of the hoisting motor and a brake controlling device, which comprises means for determining a variable which describes the load of the hoisting motor from the current and supply voltage of the hoisting motor, the brake controlling device further comprising means for comparing the variable describing the load with a pre-determined limit value and means for interrupting hoisting or lowering of the load if the variable describing the hoisting apparatus load exceeds the limit value set for the hoisting movement when the load is hoisted or if it exceeds the limit value set for the lowering movement when the load is lowered, wherein the variable describing the hoisting apparatus load is air gap torque of the hoisting motor.

19. An apparatus according to claim 18, wherein the air gap torque is arranged to be determined utilizing magnetization flux of the hoisting motor determined on the basis of the current, supply voltage and stator winding resistance of the hoisting motor.

20. An apparatus according to claim 13, wherein the magnetization flux of the hoisting motor is arranged to be determined by integrating as a function of time the magnetization voltage of the hoisting motor determined on the basis of the current, supply voltage and stator winding resistance of the hoisting motor.

* * * * *